May 17, 1932.  H. ALFARO  1,858,259
AIRPLANE
Filed Sept. 22, 1928
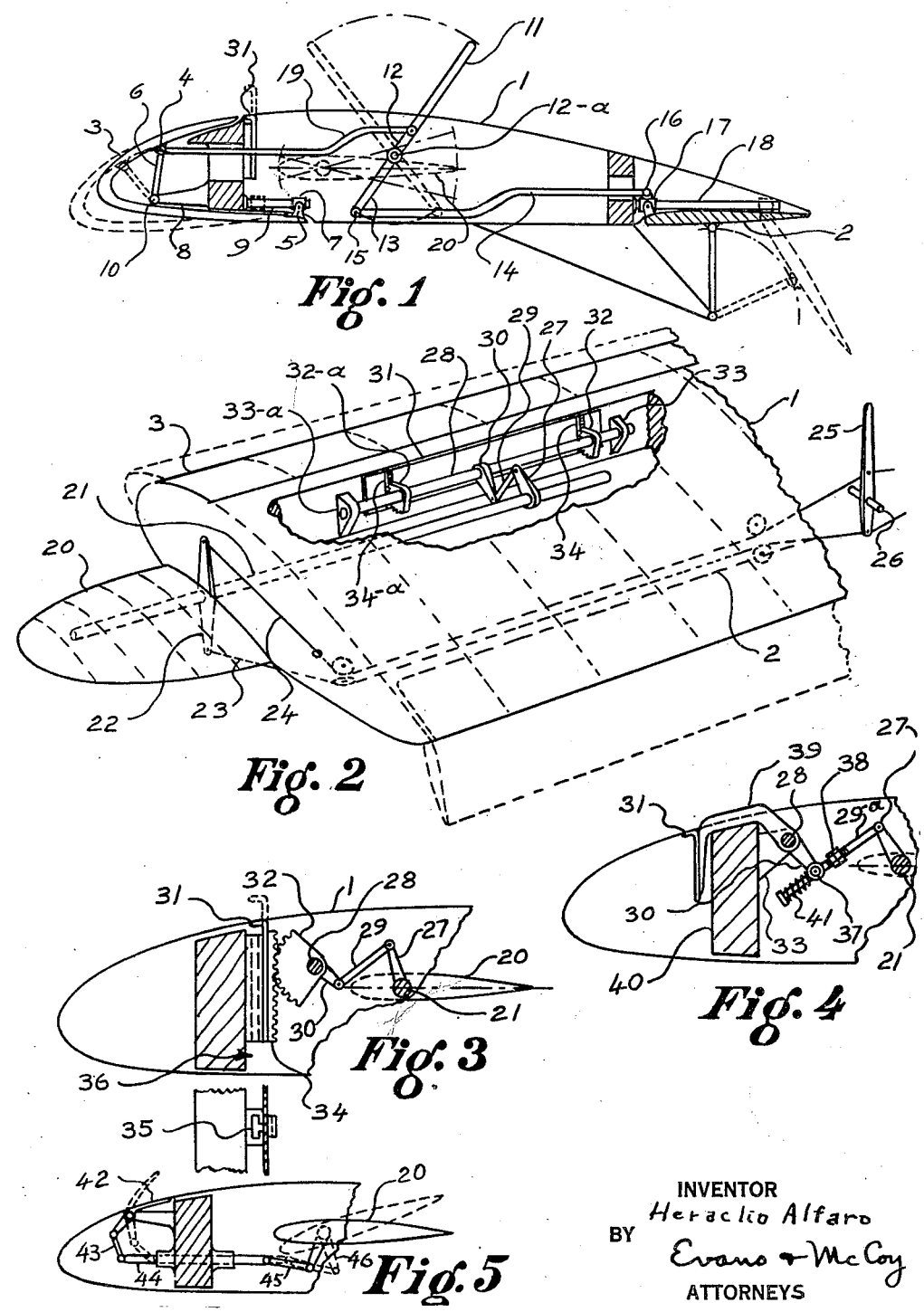
INVENTOR
Heraclio Alfaro
BY Evans + McCoy
ATTORNEYS Patented May 17, 1932

1,858,259

UNITED STATES PATENT OFFICE

HERACLIO ALFARO, OF EAST CLEVELAND, OHIO

AIRPLANE

Application filed September 22, 1928. Serial No. 307,704.

This invention relates to airplanes and more particularly to airplane wings and airplane control surfaces, and has for its object to provide advantageous means for increasing the efficiency of airplane lifting surfaces and of its rolling control elements.

In airplanes, it has been found advantageous to use wings in which the ratio of maximum lift to minimum drag obtainable is large. Flaps are used to increase that ratio in a normal wing by increasing at will the maximum lift obtainable without increasing the minimum drag appreciably. Variable camber and variable area wings are also used to obtain in a similar manner, an increase in this ratio.

In most of the devices above referred to, there is a detrimental translation of the center of pressure which requires additional provisions for proper balance. In some cases, the mechanical and structural arrangements incorporated are complicated or expensive and increase the dead weight and in others, the lift increasing elements conflict with the rolling control elements and hamper the efficiency of either or of both elements.

An object of this invention is to provide advantageous means for increasing the ratio of maximum lift to minimum drag of airplane wings with little disturbance of the center of pressure.

Another object of this invention is to obtain higher values of said ratio than are otherwise possible.

A further object of this invention is to so arrange the parts as not to hamper the responsiveness of the controlling elements nor the proper balance.

Another object of this invention is to provide rolling control independently of the lift increasing elements.

A further object of this invention is to provide a rolling control which is effective at high angles of attack and so designed that the yawing moment created by its operation is advantageous.

With the above and other objects in view, the invention may be said to comprise the airplane as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Figure 1 shows a section, a flap wing embodying the control devices of the present invention.

Fig. 2 is a perspective view of a flap wing such as shown in Fig. 1 showing some of the actuating mechanisms.

Fig. 3 shows details of the lateral control mechanism illustrated in Fig. 2.

Fig. 4 shows another form of actuating mechanism for operating the lateral control devices.

Fig. 5 shows still another actuating mechanism for operating the lateral control devices.

I have found that by arranging the "nose" or forward part of a wing so as to allow adjustment thereof forwardly, the maximum obtainable lift of wings can be considerably increased at will without increasing appreciably the minimum drag, with the result that a net increase of the ratio of maximum lift to minimum drag is obtained. Furthermore, I have found that an angular movement of the nose properly combined with the forward movement thereof results in a further increase of said ratio.

This combined motion of the nose when operated provides an increase in the camber simultaneously with an increase in the chord of the wing, the increase in the camber and the increase in the chord each having the effect of increasing the maximum lift of a wing, resulting, therefore, in an aggregated increase of the ratio of maximum lift to minimum drag. Furthermore, I have found that the above described adjustments of the nose of a wing are advantageous when applied to wings of various types, whether plain wings or wings having flaps or variable area devices, and that, in many cases, the addition of said nose adjustments improves the stability characteristics of wings.

I have also found that, in the case of flap wings, that it is advantageous to mechanically correlate the motions of the nose with the motions of the flap and to operate the nose and flap simultaneously by means of a single operating device.

Moreover, I have found that I can provide an independent means for rolling control which makes it possible to use a flap and a movable nose which both extend along the entire span of the wing which space would otherwise have to be compromised with that required for the ailerons or other rolling control devices.

There is illustrated in Figs. 1 and 2 of the drawings, a wing 1 and a flap 2 of the type described in my copending application Serial No. 236,342, filed Nov. 28, 1927. The wing 1, as shown in cross section in Fig. 1, is provided with a nose 3 which is supported at spaced points along the body of the wing by movable pivots 4 and 5, each of the pivots 4 being carried by a swinging arm 6 and each of the pivots 5 by a sliding bushing 7, the arms 6 being pivoted to brackets 8 fixed to the body of the wing and the bushings 7 being slidable on guide bars 9 also fixed to the body of the wing. At each of the points of support, the arm 6 is pivoted to its bracket 8 by a pin 10, and each bushing 7 is free to slide along a guide bar 9 in alinement with the bracket and to the rear thereof. As many supporting units will be provided as may be deemed necessary for the rigidity and proper operation of the movable nose.

As illustrated in Fig. 2, the movable nose 3 extends nearly the full length of the wing, each end lying within the rounded corner at the tip of the airfoil for convenience of construction. A flap 2, which operates as described in my above mentioned application, is preferably provided along the rear edge of the wing, its motions being controlled by a lever 11 located within convenient reach of the operator and fixed to an axle 12a which extends lengthwise of the wing. In front of each unit supporting the movable nose, oppositely extending arms 12 and 13 are fixed to the axle 12a. Links 14 pivoted at 15 and 16 to the arms 13 and to the flap 2 serve to operatively connect the lever 11 to the flap 2 through a bushing 17 which slides on a tube 18 rigidly secured to the body of the wing, while links 19 serve to connect the arms 12 to the nose, so that correlated motions are transmitted to the movable nose.

In case the movable nose is applied to a plane wing with no flaps, the arms 13 and links 14 are eliminated and the rear part of the wing structure may be of any construction that may be desired, in which case, the lever 11 serves only to operate the movable nose 3.

Forward movement of the lever 11 causes forward movement of the nose which results in an increase in the camber and in the chord of the wing. In Fig. 1, the dotted lines show the modified shape of the wing resulting from the actuation of the nose and flap by lever 11.

Obviously, if desired, actuation of the nose and of the flat may be made independent by adding another shaft like shown at 12a with another lever like 11 and by placing all arms 12 in one shaft and all arms 14 in the other. It is also evident that the movable nose can be adapted to various types of flap wings and that the linkage 14 may be connected to any adjustable flap to obtain simultaneous motion of the flap and nose.

The forward adjustment of the movable nose increases the area in the forward part of the wing and tends to bring forward the center of pressure or lift of the wing. In flap wings, the effect of downward adjustment of the flap is to carry the center of pressure backwards. The combined effect of the movements of the nose and flap, is obviously to minimize the translation of the center of pressure. This is advantageous for stability and balance.

The rolling control device as shown in Figs. 2 and 3 is mounted independently of the movable nose and flap so as not to interfere with their movements.

For simplicity of illustration, the left hand side wing tip only is shown. An aileron 20 is mounted beyond the wing tip on the shaft 21 which extends longitudinally into the body of the wing and which is journaled in bearings therein. A lever 22 fixed at its center to the shaft 21 and cables 23 and 24 secured to the opposite ends of the lever 22 govern the motions of the aileron 20. The cables 23 and 24 extend over suitable guides to a suitable actuating lever 25 pivoted at 26 and positioned at a point convenient to the pilot. Motions of the ailerons 20 are preferably correlated to those of the adjacent spoiler plates and, at their inner ends, the shafts 21 have arms 27 which transmit correlated rotational motions to shafts 28 which operate the plates through links 29 and an arm 30 fixed to the shaft 28. Rotation of shaft 28 on its bearings 33 and 33a results in vertical movements of a spoiler plate 31 through gear segments 32 and 32a. These segments are in mesh with vertical racks 34 and 34a which are riveted to the plate 31 and guided in T slots 35.

In normal flying, the control lever 25 is in neutral position, the ailerons of the right and left hand wings are positioned at the same angle to the wind direction as the wings or nearly so, and the spoiler plates 31 are confined within the wing contour. By operating lever 25, rotative movements are imparted to the ailerons 20, one in one direction and the other in the opposite direction, thereby imparting a rolling moment to the plane. Vertical movement is simultaneously imparted to the plate 31 and the linkages are so arranged that the plate 31 will be projected out of the wing profile only when the adjacent aileron 20 is rotated in a direction to reduce the lift. The effect of the projecting plate 31 is to disturb the airflow and to cause a reduction of lift in the part of wing beyond and near by it.

The aggregate effect of the movements of the vane and of the plate when acting in the directions above mentioned is to increase the reduction of lift.

When the lever 25 is moved in the opposite direction, the movements of vane 20 and plate 31 are also opposite, in which case the vane 20 increases its angle of attack and the plate 31 is shifted further into the wing. The effect of the vane 20 in this case is to increase the lift while that of the spoiler plate 31 is practically nil. The vane 20 is more effective as a rolling control element when the wings are placed at small angles of attack and the flying speed is high. The plate 31 is more effective as a lift reducing element when the angle of attack of the wing is high. The combined action of both is therefore effective throughout a larger range of flying attitudes than either device used alone.

Moreover, the combined action of the ailerons and the spoiler plates as above described improves considerably the usual yawing effect due to the operation of the rolling controls. When plate 31 protrudes from the top of the wing, the drag of that portion of the wing increases, while in the wing of the opposite side, the motion of the plate is reversed and the drag remains practically unchanged, so that a yawing moment is created. The aileron 20 and its opposite of the right side wing, when operated change their angle of attack. One of the ailerons increases its angle of attack while the other reduces it. The aileron having the larger angle causes a larger drag. This unequal drag causes a yawing moment. The yawing moment caused by the operation of the ailerons is opposite that due to the motion of the spoiler plates. Therefore, the yawing effect of the spoiler plate tends to neutralize the yawing effect of the ailerons. This yawing effect can be nearly neutralized by properly proportioning the sizes and movements of the plates 31.

I prefer to obtain a larger yawing moment from the plates than from the ailerons so that the yawing moment resulting from the combined motions of both will be in a reverse direction to the usual yawing moment created by the orthodox aileron type of rolling control when in operation.

Means may be advantageously provided to minimize the inward motion of plate 31 so as to maintain a smooth top in the wing profile inasfar as possible. An operating device of this character for the plates 31 is shown in Fig. 4 of the drawings in which the link 29 is replaced by a rod 29a which slides through a pivoted bushing 37 at the end of the arm 30 and has a stop 38 engageable with the bushing so that motion of plate 31 will start after a certain displacement of vane 20 if desired. The stop 38 is preferably adjustable to vary the extent of movement of the vane 20 before the movement of the plate 31 is started. As shown in Fig. 4, the plate 31 is supported by arms 39 connected rigidly to the shaft 28. In the normal position thereof, the arms 39 are maintained against the top of a structural member 40. While the stop 38 is away from the bushing 37, the spring 41 maintains the plate 31 within the wing profile, but after the stop 38 engages the bushing 37, the arm 39 is swung upwardly, raising the plate 31 above the wing profile.

In Fig. 5, there is shown a rolling control in which a positive mechanical connection is provided between the ailerons and spoiler plates in which the rate of movement of the spoiler plate is progressively increased as the aileron is shifted out of normal position. In this modification, pivoted spoiler plates 42 are employed and these plates are connected by links 43 to the forward ends of sliding rods 44 which are connected at their rear ends by links 45 to arms 46 fixed to the shaft of the aileron.

The links 45 of each spoiler plate are so arranged that when the aileron with which the plate is connected is in neutral position, the links are nearly at right angles to the rods 44 so that at the beginning of the movement of the aileron from neutral position, the movement of the spoiler plate is very slow and progressively increases as the aileron is moved farther from neutral position. The arms 46 are so disposed with respect to the rods 44 that the rate of linear movements of the rods are substantially proportional to the angular movements of the aileron. This form of actuating mechanism is advantageous in that the desired differential actuation of the spoiler plates is obtained without the use of springs or lost motion gaps and for the reason that a more positive and reliable actuation of the spoiler plates is obtained.

In an airplane with my improved type of wing, the ratio of the maximum obtainable lift to the minimum possible drag is increased. Thus the lift can be increased at any desired time by operating the movable nose either alone or simultaneously with the flaps; the minimum drag can be kept low when the nose is brought back to normal; the maximum ratio of the former to the latter is therefore increased. Stability and balance characteristics are improved by the use of the described movable nose when applied to flap wings.

The arrangement of an independent rolling control allows the use of a larger flap or other lift increasing device without having to compromise in the space available. And the particular rolling control elements described provide satisfactory responsiveness throughout a large range of angles of attack with advantageous yawing moments. The mechanical parts are simple and operative and can be made within a reasonable dead weight.

It will be thus seen that I have provided advantageous improvements in lifting surfaces and in rolling control mechanisms by which airplanes may be improved in performance, stability and control.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. An airplane having wings provided with ailerons positioned entirely beyond the tips thereof, each wing having a nose portion extending the full length thereof which is bodily adjustable to vary the area and camber of the wing, and spoiler plates mounted in the forward portions of the wings and operatively connected to said ailerons.

2. An airplane having wings provided with ailerons at the tips thereof, each wing having a nose portion which is bodily adjustable to vary the area and camber of the wing, and spoiler plates carried by the wings, each movable from a position within the wing to a position in which it projects above the top surface of the wing.

3. An airplane having wings provided with angularly adjustable flaps along the rear edges thereof, and ailerons at the tips thereof, means along the forward edges of the wings for increasing the area and varying the camber of the wings, spoiler plates adjacent the forward edge portions of the wings which are adjustable from a position within the top surface of the wing to a position in which they project above said top surface, means for simultaneously operating said flaps and area increasing means, and means for simultaneously operating said ailerons and plates.

4. An airplane wing having a nose portion mounted for adjustment bodily forwardly and rearwardly on the body of the wing, members adjacent the rear edge of the wing mounted for adjustment bodily forwardly and rearwardly, a flap pivoted along its forward edge to said members, and means for simultaneously shifting the nose portion and members in opposite directions and for automatically moving the nose and flap angularly during such movements of the nose and members.

5. An airplane wing having a nose portion mounted for adjustment bodily forwardly and rearwardly on the body of the wing, and extending the full length thereof, members adjacent the rear edge of the wing mounted for adjustment bodily forwardly and rearwardly on the body of the wing, a full span flap pivoted along its forward edge to said members, and means for simultaneously shifting the nose and members in opposite directions and for simultaneously imparting angular movements to the nose and flap.

6. An airplane having wings provided with ailerons at the tips thereof, means for imparting rotative movements to said ailerons, spoiler plates mounted in the wings adjacent the forward edges thereof, means connecting each aileron with a spoiler plate, for imparting upward movement to the plate as the corresponding aileron is moved in a direction to reduce its angle of attack, said spoiler plates being substantially ineffective during the initial movement of the ailerons.

7. An airplane wing having a body portion, an adjustable nose having a flange overlying the top of the body portion and a flange overlying the bottom thereof, a supporting arm pivoted to the body portion of the wing and the upper flange of the nose and a supporting member slidably mounted on the body portion and pivotally connected to the lower flange of the nose.

8. An airplane having wings provided with ailerons at the tips thereof, means for imparting rotative movements to said ailerons, spoiler plates mounted in the wings adjacent the forward edges thereof, and means connecting each aileron with a spoiler plate for moving the plate at a progressively increasing rate as the aileron is moved away from neutral position.

9. An airplane having wings provided with ailerons at the tips thereof, means for imparting rotative movements to said ailerons, spoiler plates mounted in the wings adjacent the forward edges thereof, and positive mechanical connnections between the ailerons and plates for imparting to the plates a relatively slow movement during the initial movement of the ailerons from neutral position and for progressively increasing the rate of movement of the plates as the angle of the ailerons is increased.

10. An airplane having wings, each wing having a nose portion and a trailing flap simultaneously adjustable in opposite directions to vary the area and camber of the wing, and spoiler plates carried by the wings, each movable from a position within the wing to a position in which it projects above the top surface of the wing, each wing having an aileron at the tip thereof.

11. An airplane having wings provided with ailerons at the tips thereof, means for imparting rotative movements to said ailerons, adjustable flaps extending along the rear edges of the wings, spoiler plates mounted in the wings adjacent the forward edges thereof, means connecting each aileron with a spoiler plate, for imparting upward movement to the plate as the corresponding aileron is moved in a direction to reduce its angle of attack, said spoiler plates being substantially ineffective during the initial movement of the ailerons.

In testimony whereof I affix my signature.

HERACLIO ALFARO.